May 11, 1926.
H. M. PFLAGER
1,584,133
CAR TRUCK AND METHOD OF ASSEMBLING THE SAME
Filed June 7, 1924
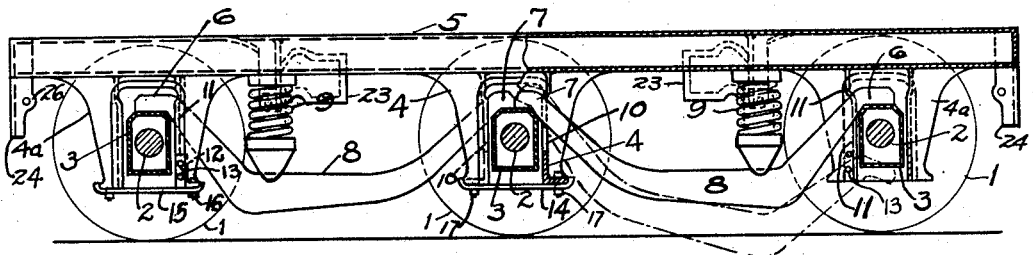
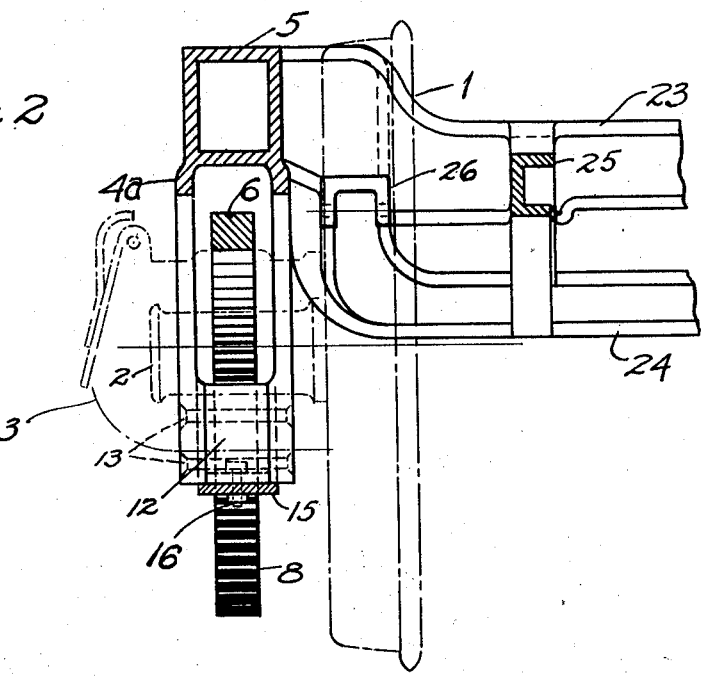
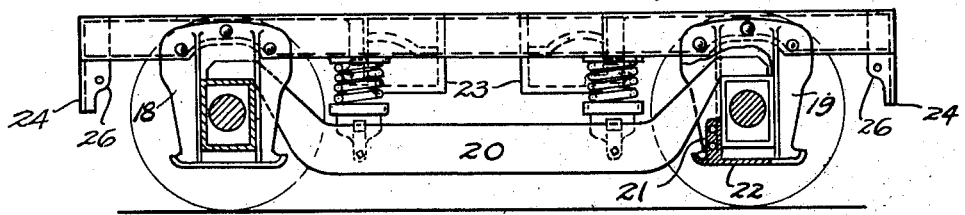
Inventor
Harry M. Pflager
By Cornwall, Bedell & Janney
ATTYS.

Patented May 11, 1926.

1,584,133

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK AND METHOD OF ASSEMBLING THE SAME.

Application filed June 7, 1924. Serial No. 718,516.

My invention relates to railroad rolling stock and consists in an improved truck construction and an improved method of assembling the truck frame journal boxes and equalizer bars.

My invention is particularly applicable to trucks of the type utilizing what is known as a "depressed" equalizer bar in which the ends of the bar rest upon the tops of the journal boxes and the intermediate portion of the bar is located at a substantially lower level and in my description the term "depressed" refers to such a bar as distinguished from a substantially straight bar resting upon the tops of the journal boxes.

For the purpose of describing my invention, car trucks may be said to comprise two types, one in which the truck frame and pedestals are formed integrally and the depressed equalizer bars are "divided", i. e., arranged in pairs, one member of each pair being on the outside of the pedestals and the other member of each pair being on the inside of the pedestals. In the other type of truck, the frame and pedestals are made separately, the pedestals being bolted or otherwise attached to the frame, and in this type each equalizing bar is formed of a single member located between the front and back faces of the pedestals.

The object of my invention is to provide a construction which will permit the use of a single equalizing bar with an integral pedestal and frame structure or, if separate pedestals are used, will permit the assembly thereof with the frame before the equalizer bars are assembled therewith.

In the accompanying drawings illustrating my invention—

Figure 1 is a side elevation of a six wheel truck embodying my invention.

Figure 2 is a transverse section through the frame and one pedestal illustrating the assembly of the equalizer bar therewith.

Figure 3 is a side elevation of a four wheel truck embodying my invention.

The truck comprises the usual wheels 1, axles 2, carrying journal boxes 3 which are mounted in pedestals 4 and 4ª so as to slide vertically therein. The truck frame includes wheel pieces 5 and in Figures 1 and 2 the wheel pieces 5 and pedestals 4 are shown as being formed integrally.

Resting upon the upper faces of the adjacent journal boxes 3 are the elevated ends 6 and 7 of the equalizer bars, the intermediate portions 8 of which are located at a substantially lower level extending below the journal boxes. It will be understood that the truck frame is supported upon the equalizers through springs 9 in the usual manner and that the other truck details may be of any familiar construction and form no essential part of the present invention.

The pedestals are of the familiar inverted U-shaped type and each pedestal has at least one leg slotted longitudinally of the truck for the passage therethrough of the end of the equalizer bar. The central pedestal has both legs so slotted while in the end pedestal it is only necessary to have the leg opposite the central pedestal slotted in this manner. The slots in the central pedestal are indicated at 10 and the slot in each of the end pedestals is indicated at 11. It will be noted that the slots 10 are enclosed and this construction of the pedestal is a usual arrangement and permits relative vertical movement of the equalizer bar and pedestal as is required by the compression and expansion of springs 9.

Slots 11 in the end pedestals differ from slots 10 in that they extend downwardly to the lower end of the pedestal and permit the corresponding end of the equalizer bar to be moved into the positions shown, or dropped therefrom through the open lower end of the pedestal leg.

With this construction it is possible to assemble the equalizer bar with the pedestals by first inserting the end 7 of the bar through the closed slot in the central pedestal, the bar taking a position approximating that indicated by dot and dash lines in Figure 1, and the end 6 of the bar may then be swung upwardly into the position indicated in full lines. This operation will be performed before the axles and boxes are applied to the pedestals.

When the equalizer bar is in position, I prefer to close the lower end of slot 11 and reinforce the inner leg of the pedestal and provide a journal box guiding surface by providing a filler 12 between the separated portions of the leg and securing the same in position by rivets 13 or similar means.

The lower ends of truck pedestal legs are usually connected by a tie bar such as indicated at 14 and the same bar may be used with the end pedestals, having the downwardly open slot 11, by securing the tie bar 15 to the filler 12 by bolts 16 or similar means corresponding to the bolts 17 which connect tie bar 14 to the integral lower ends of pedestal 4.

In the modification illustrated in Figure 3 a four wheel truck is shown and one of the end pedestals 18 is slotted in the usual manner while the other pedestal 19 is provided with a downwardly open slot as are pedestals 4ª in the six wheel truck. The filler 21 for closing the lower end of the slot in the pedestal is shown as being formed integrally with the tie bar 22 and it will be understood that this integral filler and tie bar construction may be substituted for that shown in Figures 1 and 2.

In this modification the pedestals are shown as being formed separately from the wheel pieces and bolted or riveted thereto and it will be understood that this assembly of the pedestals and wheel piece takes place before the equalizers are applied.

The application and removal of the equilizer bar 20 to and from these pedestals may be effected in the same manner as the above described operation of the bars in the six wheel truck and in both of the forms illustrated in the accompanying drawings and in the forms shown in my copending applications, Serial Nos. 718,517 and 718,518 and in such other modifications of my invention as will suggest themselves to those experienced in the art, there is present the advantages of a single depressed equalizer combined with a wheel piece and pedestals formed integrally with each other or assembled before application of the equalizer.

Obviously, both of the pedestals shown in Figure 3 may have one leg slotted full length for uniformity or to permit application of the equalizer through either pedestal. It may be noted also that the central pedestal 4 of the six wheel truck may have both of its legs slotted throughout their lengths in which case the end pedestals could have legs of the ordinary structure and the outer ends of the equalizers could be positioned first over the end journal box and the inner ends of the equalizers could then be swung upwardly through the central pedestal into position.

In the drawings I have illustrated truck frames comprising a one-piece casting and having transoms 23, end pieces 24, connecting rails 25, and brake hanger lugs 26 formed integrally with the wheel pieces and, in Figures 1 and 2, the pedestals 4 and 4ª are also formed integrally with the truck frame. This is the preferred embodiment of my invention, although, as previously stated, the invention broadly may be applied to built-up truck frames in which any or all of the parts are assembled together as are the pedestals and wheel pieces indicated in Figure 3.

I claim:

1. In a car truck, a frame including a wheel piece, pedestals integral therewith, at least one of said pedestals having a permanently enclosed slot in its leg for receiving an equalizer bar, journal boxes in said pedestals, and a removable depressed equalizer bar carried by said boxes in the same vertical plane as said wheel piece.

2. In a six wheel car truck, a frame including a wheel piece, three pedestals integral therewith, journal boxes in said pedestals, and depressed equalizer bars carried by the central box and each end box, respectively, in the same vertical plane as said wheel piece.

3. In a car truck, a frame including a wheel piece, pedestals integral therewith, at least one of said pedestals having a permanently closed slot in one of its legs, journal boxes in said pedestals, and a removable equalizer bar extending through said pedestals with its ends above said boxes and its intermediate portions below the tops of said boxes.

4. In a car truck, a car truck pedestal having a leg bifurcated parallel with the side of the pedestal, and a removable filler fitting between and reinforcing the separated portions of said leg and adapted to guide a journal box in the pedestal.

5. A car truck pedestal having a leg bifurcated parallel with the side of the pedestal, a removable filler fitting between the lower separated portions of said leg and adapted to guide a journal box mounted in the pedestal, and securing elements for said filler and leg portions.

6. In a car truck, a frame, pedestals, one leg of one of said pedestals having an enclosed slot near its upper end and the opposite leg of another pedestal on the same side of the truck having a downwardly open slot.

7. In a car truck, a frame, pedestals, one leg of one of said pedestals having an enclosed slot near its upper end and the opposite leg of another pedestal on the same side of the truck having a downwardly open slot, and an equalizing bar having its ends extending through said slots and its intermediate portions depressed.

8. In a six wheel car truck, a frame, a central and end pedestals spaced longitudinally of the same side thereof, said central pedestal having enclosed slots in its legs near the upper ends thereof and each of said end pedestals having a downwardly open slot in the leg opposite said central pedestal, which slot extends upwardly to a point near the top of the leg.

9. In a car truck, a frame including a wheel piece, spaced pedestals, and a depressed equalizer bar in the same vertical plane as said wheel piece, axles and journal boxes, one of said pedestals being adapted to permit removal of said bar without disassembly of said pedestal from said wheel piece or removal of the journal boxes in both pedestals.

10. In a car truck, a frame including a wheel piece, spaced pedestals, one of which has a downwardly open slot in its edge, axles and journal boxes, and a depressed equalizer bar in the same vertical plane as said wheel piece and having elevated ends, projecting through the edges of said pedestals, and having a depressed intermediate portion connected to at least one of said ends by an inclined portion whereby said bar may be removed from both of said pedestals without removal of both journal boxes therein.

11 The method of assembling or disassembling an equalizer bar with a truck frame having a wheel piece and pedestals, consisting in pivoting said bar on one end and swinging its opposite end in a vertical plane beneath the wheel piece into or out of its assembled position adjacent the wheel piece.

12. The method of assembling an equalizer bar with a truck frame so that the equalizer lies in the same vertical plane as the wheel piece of the frame, consisting in placing one end of the bar proximately in its assembled position, and raising the other end of the bar upwardly into its position.

13. The method of assembling an equalizer bar with a truck frame having spaced pedestals, which consists in inserting one end of the equalizing bar through a leg of one pedestal at a point near the top of the latter and swinging the other end of said bar upwardly and longitudinally through a leg of the other pedestal to move it into position near the top of the latter pedestal.

14. The method of assembling an equalizer bar with a truck frame having spaced pedestals which consists in inserting one end of the equalizing bar through a leg of one pedestal at a point near the top of the latter and swinging the other end of said bar upwardly and longitudinally through a downwardly opening slot in the opposing leg of the other pedestal to move it into position near the top of the latter pedestal and closing the open slot with a leg reinforcing member.

15. In a car truck, a one-piece frame including wheel pieces and pedestals integral therewith, at least one of said pedestals having enclosed slots for equalizer bars, journal boxes in said pedestals, and removable depressed equalizer bars carried by said boxes in the same vertical planes as said wheel pieces.

16. In a car truck, a frame including wheel pieces, pedestals and a transom formed integrally with said wheel pieces, a leg on each of said wheel pieces having an equalizer bar slot, at least one of the slots for receiving each equalizer bar being closed at its lower end by a cross element formed integrally with the pedestal, journal boxes in said pedestals, and depressed equalizer bars carried by said boxes in the same vertical planes as said wheel pieces.

17. In a car truck, a frame including wheel pieces, pedestals, an end piece and a transom formed integrally with said wheel pieces, a leg on each of said wheel pieces having an equalizer bar slot, at least one of the slots for receiving each equalizer bar being closed at its lower end by a cross element formed integrally with the pedestals, and journal boxes in said pedestals, and depressed equalizer bars carried by said boxes in the same vertical planes as said wheel pieces.

18. In a car truck, a frame including wheel pieces, end pieces, a transom, and transom and end piece connecting rails, and pedestals all formed integrally, a leg on each of said wheel pieces having an equalizer bar slot, at least one of the slots for receiving each equalizer bar being closed at its lower end by a cross element formed integrally with the pedestals, journal boxes in said pedestals, and depressed equalizer bars carried by said boxes in the same vertical planes as said wheel pieces.

19. In a car truck, a frame including wheel pieces, end pieces, a transom, and transom and end piece connecting rails and brake hanger lugs, and pedestals all formed integrally, a leg on each of said wheel pieces having an equalizer bar slot, at least one of the slots for receiving each equalizer bar being closed at its lower end by a cross element formed integrally with the pedestals, journal boxes in said pedestals, and depressed equalizer bars carried by said boxes in the same vertical planes as said wheel pieces.

20. In a car truck, a frame including a one piece casting including spaced wheel pieces, spaced transoms and end pieces connecting said wheel pieces, spaced connecting rails between said wheel pieces and transoms, and pedestals, a leg on each of said wheel pieces having an equalizer bar slot, at least one of the slots for receiving each equalizer bar being closed at its lower end by a cross element formed integrally with the pedestals, journal boxes in said pedestals, and removable depressed equalizers carried by said boxes in the same vertical planes as said wheel pieces.

In testimony whereof I hereunto affix my signature this 28th day of May, 1924.

H. M. PFLAGER.